US006834862B2

(12) United States Patent
Wilkinson

(10) Patent No.: US 6,834,862 B2
(45) Date of Patent: Dec. 28, 2004

(54) SHAFT SEALING SYSTEM FOR A ROTARY MECHANICAL DEVICE

(76) Inventor: Mark R. Wilkinson, 8 Cullen Rd., Huntington, MA (US) 01050

(*) Notice: Subject to any disclaimer, the term of this patent is extended or adjusted under 35 U.S.C. 154(b) by 0 days.

(21) Appl. No.: 10/055,542

(22) Filed: Jan. 23, 2002

(65) Prior Publication Data

US 2003/0107183 A1 Jun. 12, 2003

(51) Int. Cl.[7] ............................................... F16J 15/26
(52) U.S. Cl. ........................ 277/510; 277/511; 277/512; 277/516
(58) Field of Search ................................ 277/510, 511, 277/512, 516

(56) References Cited

U.S. PATENT DOCUMENTS

| | | | | |
|---|---|---|---|---|
| 528,773 | A | * 11/1894 | Ellis | 277/513 |
| 1,211,166 | A | * 1/1917 | Keating | 384/149 |
| 2,330,781 | A | * 9/1943 | Langmyhr et al. | 417/432 |
| 2,628,112 | A | * 2/1953 | Hebard | 277/506 |
| 3,602,613 | A | * 8/1971 | Gunther et al. | 417/437 |
| 4,270,760 | A | * 6/1981 | Greiman | 277/350 |
| 4,353,388 | A | * 10/1982 | Isoyama et al. | 137/240 |
| 4,500,096 | A | * 2/1985 | Tuttle et al. | 277/416 |
| 4,647,050 | A | * 3/1987 | Johnson | 277/329 |
| 4,872,690 | A | 10/1989 | Dunford | |
| 5,167,418 | A | 12/1992 | Dunford | |
| 5,171,022 | A | * 12/1992 | Fessmann | 277/516 |
| 5,336,048 | A | 8/1994 | Ganzon et al. | |
| 5,538,256 | A | * 7/1996 | Rinne | 277/453 |
| 5,553,868 | A | 9/1996 | Dunford | |
| 5,772,218 | A | * 6/1998 | Burgess | 277/516 |
| 5,921,554 | A | * 7/1999 | Derian et al. | 277/516 |
| 5,979,483 | A | * 11/1999 | Zapalac | 137/15.01 |
| 5,984,627 | A | 11/1999 | Ramsay | |
| 6,053,500 | A | 4/2000 | Fondelius | |
| 6,210,103 | B1 | 4/2001 | Ramsay | |
| 2003/0026718 | A1 | * 2/2003 | Dziver et al. | 417/423.9 |

* cited by examiner

*Primary Examiner*—Alison Pickard
*Assistant Examiner*—Enoch Peavey
(74) *Attorney, Agent, or Firm*—Reed Smith LLP; Michael I. Wolfson

(57) ABSTRACT

A sealing system to be inserted into the seal cavity of a rotary mechanical device to provide a seal and a bearing surface to eliminate whip in a rotating shaft. The sealing system includes a split bushing element to allow easy installation over the shaft. The bushing is substantially cylindrical with an inner bore closely approximating the outer diameter of the shaft and includes a groove at the motor end on the outer surface and a corresponding groove on the inner surface to provide a lantern ring. Seal water openings are provided between the outer groove and inner groove of the bushing. Generally, two or three packing rings are added on the motor side to complete the shaft sealing system for installation in the seal cavity.

17 Claims, 4 Drawing Sheets

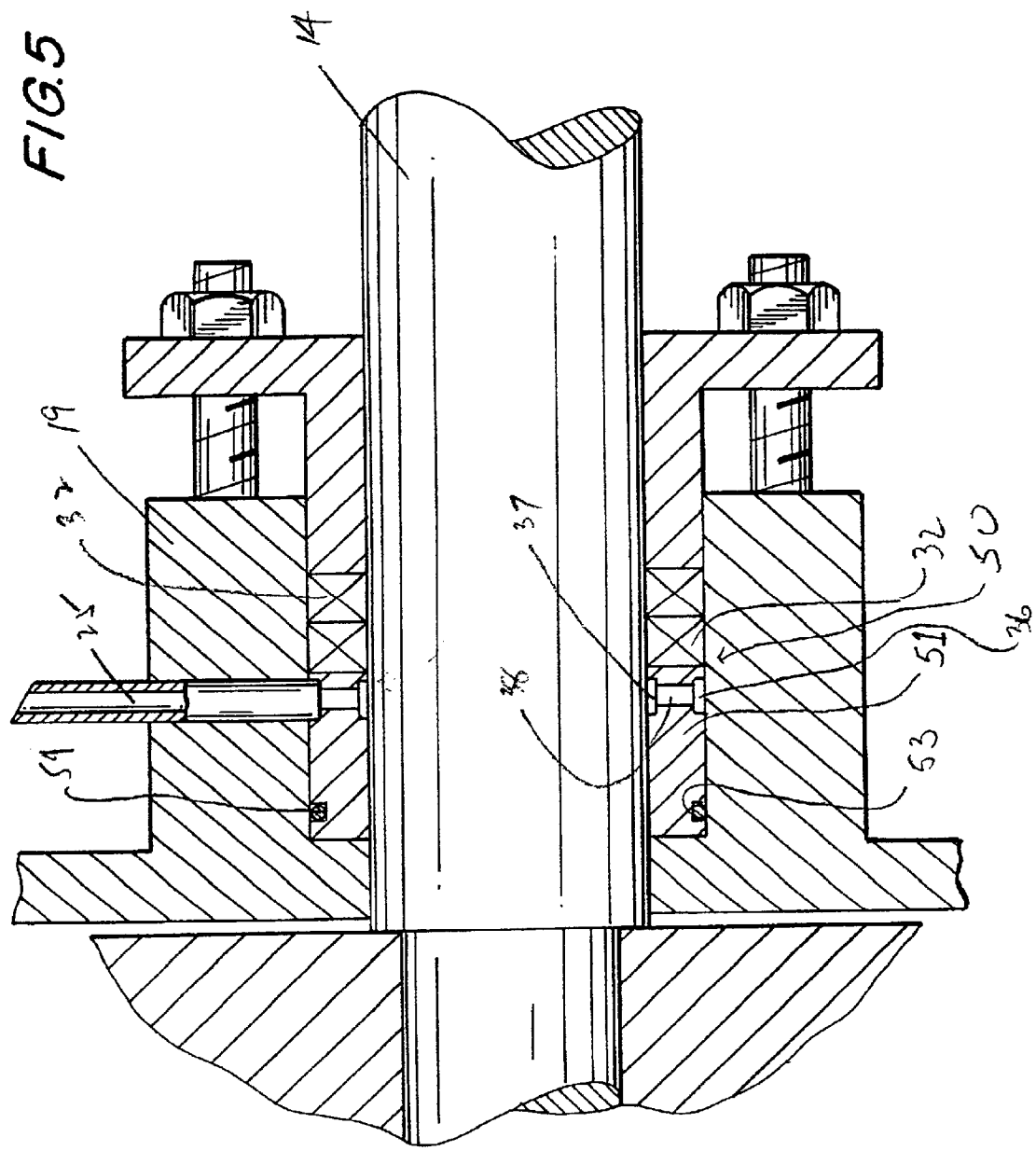

SHAFT SEALING SYSTEM FOR A ROTARY MECHANICAL DEVICE

BACKGROUND OF THE INVENTION

This invention relates to a shaft sealing system for a rotary mechanical device requiring a shaft seal and more particularly to an improved sealing system including a split bushing seal element that is placed in a seal cavity or stuffing box of the mechanical device.

Rotary mechanical devices, such as mixers and centrifugal pumps include an impeller mounted on a shaft which is driven by an electrical motor. The shaft passes through a seal cavity or a stuffing box defined by a cylindrical cavity in the device housing. The shaft is supported by bearings at the motor end and seals are placed in the stuffing box to engage the shaft to prevent fluid from passing through the seal cavity and reaching the bearing and the motor, causing damage to both.

In mechanical pumps the seal cavity passes chemical fluids or solvents being pumped, many of which are corrosive. Accordingly, it is important that appropriate packing material is placed within the seal cavity. Seal water is pumped into the seal cavity through a flush port to prevent the fluid being pumped or mixed from travelling along the shaft to the bearings and motor and to provide lubricant to the packing. Over extended use, the pump shaft may develop a whip as the bearings wear. Thus, it is highly desirable to provide a sealing system that provides an effective seal and an additional bearing surface to reduce the whip that can occur as the shaft rotates thus controlling the amount of seal water entering a lantern ring groove in the seal cavity.

While there are a wide variety of devices available for use in providing a seal cavity bushing, it is desirable to provide a improved sealing system providing an additional bearing surface for the impeller end of the shaft and cause a reduction in the pumped or mixed fluid entering the seal cavity to be countered by the seal water and packing in order to provide advantages over available devices.

SUMMARY OF THE INVENTION

Generally speaking, in accordance with the invention, a shaft sealing system for a rotary mechanical device including a substantially rigid cylindrical bushing having an inner bore to be positioned over a shaft and at least one complimentary flexible packing ring to be inserted into the seal cavity and moved to the impeller end is provided. The rigid member is a cylindrical bushing including a lantern ring at the motor end. The inner bore provides a bearing surface for eliminating whip in the device shaft. The bushing is split to provide easy installation over an installed device shaft.

The bushing seal element in accordance with the invention is substantially rigid and is manufactured of a non-ferrous metal or filled thermoplastic material for providing an improved bearing surface and resistance to industrial solutions. The inner bore of the bushing closely approximates the outer diameter of the pump shaft. The motor end includes an internal groove and a corresponding outer groove with seal water openings to provide a lantern ring on the motor side of the bushing. Generally, two or three packing rings are added on the motor side to complete the installation.

Accordingly, it is an object of the invention to provide an improved shaft sealing system to be inserted into a seal cavity of a rotary mechanical device.

Another object of the invention is to provide an improved shaft sealing system for a rotary mechanical device including a rigid bushing member for supporting the impeller end of the device shaft.

A further object of the invention is to provide an improved shaft sealing system for a rotary mechanical device including a rigid bushing member having an integral lantern ring grove for controlling the amount of seal water entering the seal cavity.

Still another object of the invention is to provide an improved sealing system for a rotary mechanical device having an outer O-ring for improved isolation of the product being handled and seal water in the seal cavity.

Yet another object of the invention is an improved rigid seal bushing for use with complementary flexible packing rings for use in a shaft sealing system to be inserted into the seal cavity of rotary mechanical devices.

Still other objects and advantages of the invention will in part be obvious and will in part be apparent from the specification.

The invention comprises a product possessing the features, properties, and the relation of components which will be exemplified in the product hereinafter described and the scope of the invention will be indicated in the claims.

BRIEF DESCRIPTION OF THE DRAWINGS

For a fuller understanding of the invention, reference is had to the following description taken in connection with the accompanying drawings, in which:

FIG. 5 is a side elevational view of an embodiment of the invention wherein the bushing element of the shaft sealing system of FIG. 2 includes an outer O-ring.

DESCRIPTION OF THE PREFERRED EMBODIMENTS

Figure 1:
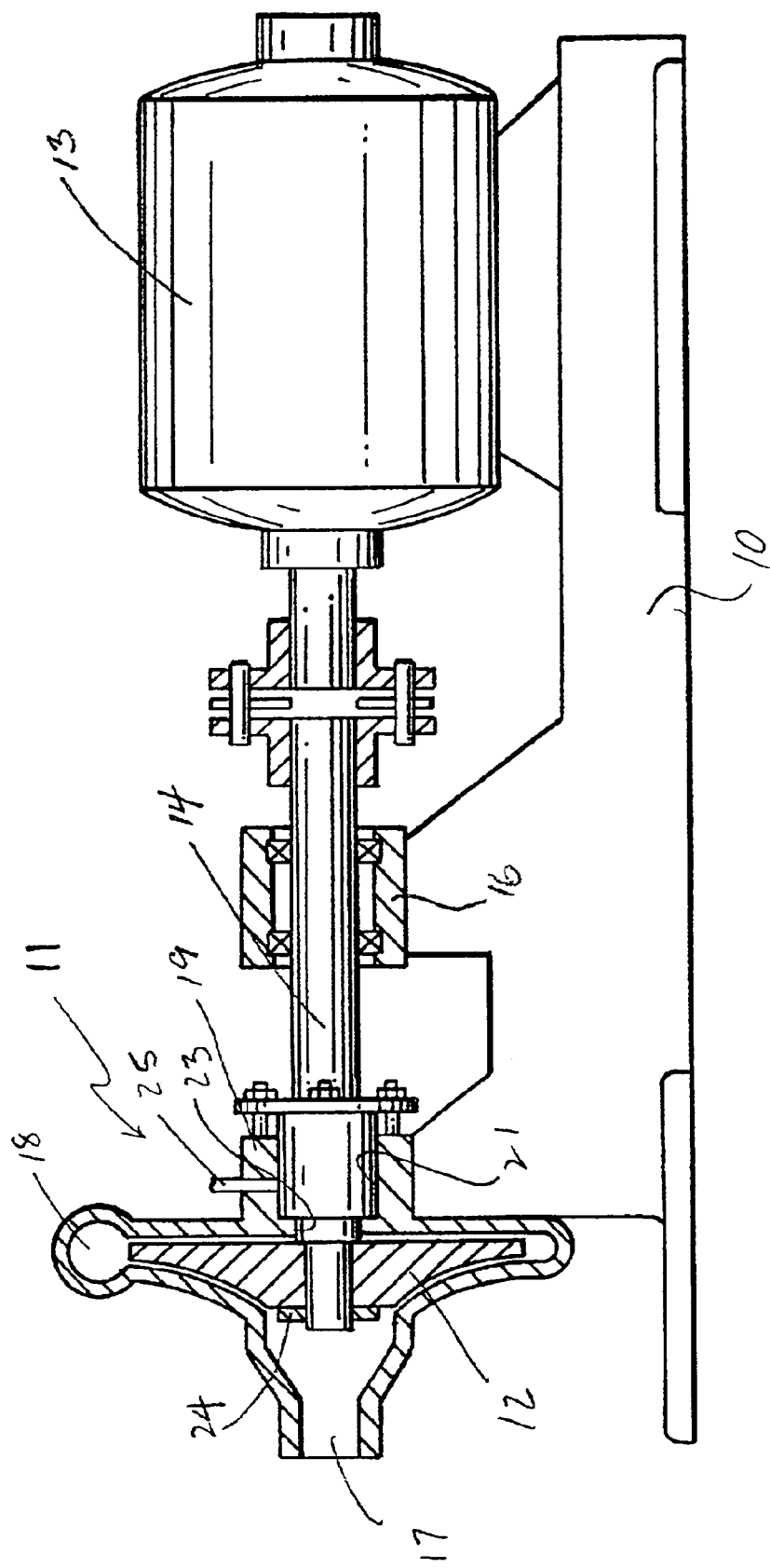
FIG. 1 is a partial cross-sectional view of a typical rotary fluid pump requiring installation of a seal system in the seal cavity.

FIG. 1 illustrates a generic form of a centrifugal pump 11 in cross-section mounted on a frame 10. Pump 11 includes a centrifugal impeller 12 driven by an electric motor 13 that drives a rotary shaft 14 coupled to impeller 12. Shaft 14 is supported by a bearing housing 16 and rotates to draw fluid in through an impeller inlet 17 and expel the fluid out through a radial impeller outlet 18. Pump 11 includes a housing 19 having an internal bore 21 that defines a seal cavity or stuffing box 22 with shaft 14 passing therethrough as shown in detail in FIG. 2. Housing 19 includes an opening 23 through which shaft 14 passes to engage impeller 12 and also includes a flush port 25 for introduction of seal water into seal cavity 22. Shaft 14 is coupled to impeller 12 by a nut or fastener 24 at the end portion of shaft 14 projecting through impeller 12.

Pump 11 operates by drawing a fluid to be pumped into inlet 17. During pumping, fluid tends to migrate and be forced into seal cavity 22 through opening 23. A wide variety of seals and venting configurations are available to be placed in seal cavity 22 abutting opening 23 in order to restrict and limit entry of pumped fluid into seal cavity 22. If fluid enters seal cavity 22 and migrates to bearings 13, the bearings will be subject to substantial degradation due to the corrosive action of the pumped fluid.

Figure 2:
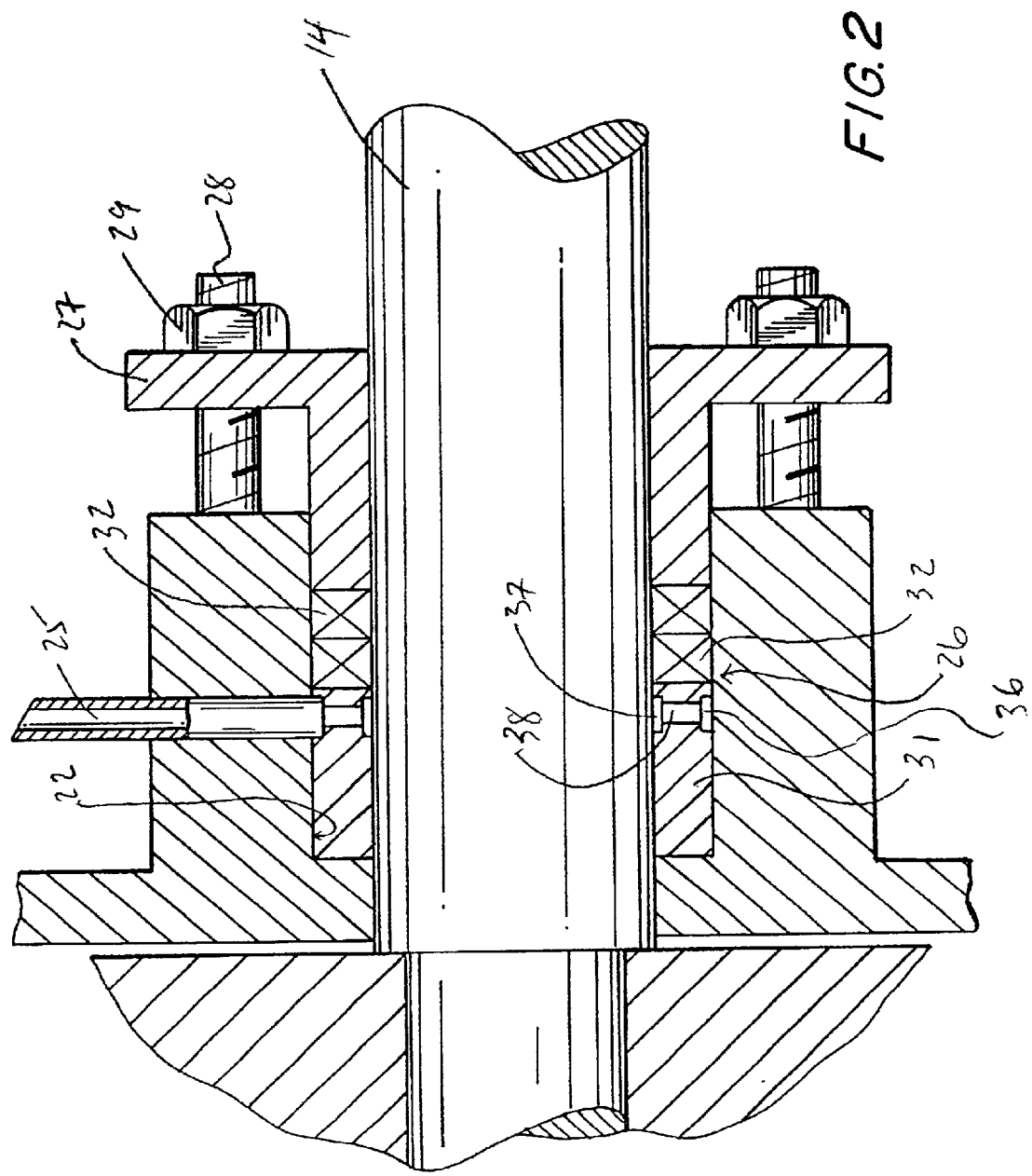
FIG. 2 is an enlarged cross-sectional view of the seal cavity of the pump of FIG. 1 showing a shaft sealing system in accordance with the invention in place in the seal cavity.

FIG. 2 is an enlarged view of seal cavity 22 with a shaft sealing system 26 in accordance with the invention in place. The motor end of seal cavity 22 is defined by a gland follower 27 mounted on gland bolts 28 and secured in place by gland nuts 29.

As shown in FIG. 2, shaft sealing system 26 installed in seal cavity 22 includes a bushing seal element 31 positioned against the impeller end of seal cavity 22. A pair of compressible sealing rings 32 are positioned on the motor side of seal element 31. These elements are secured within seal cavity 22 by gland follower 27. Various types of packing rings suitable for us are shown in U.S. Pat. Nos. 53,701,926, 4,559,862, 4,431,698, 4,371,180 and 4,298,207, the contents of which are incorporated by reference.

Figure 4:
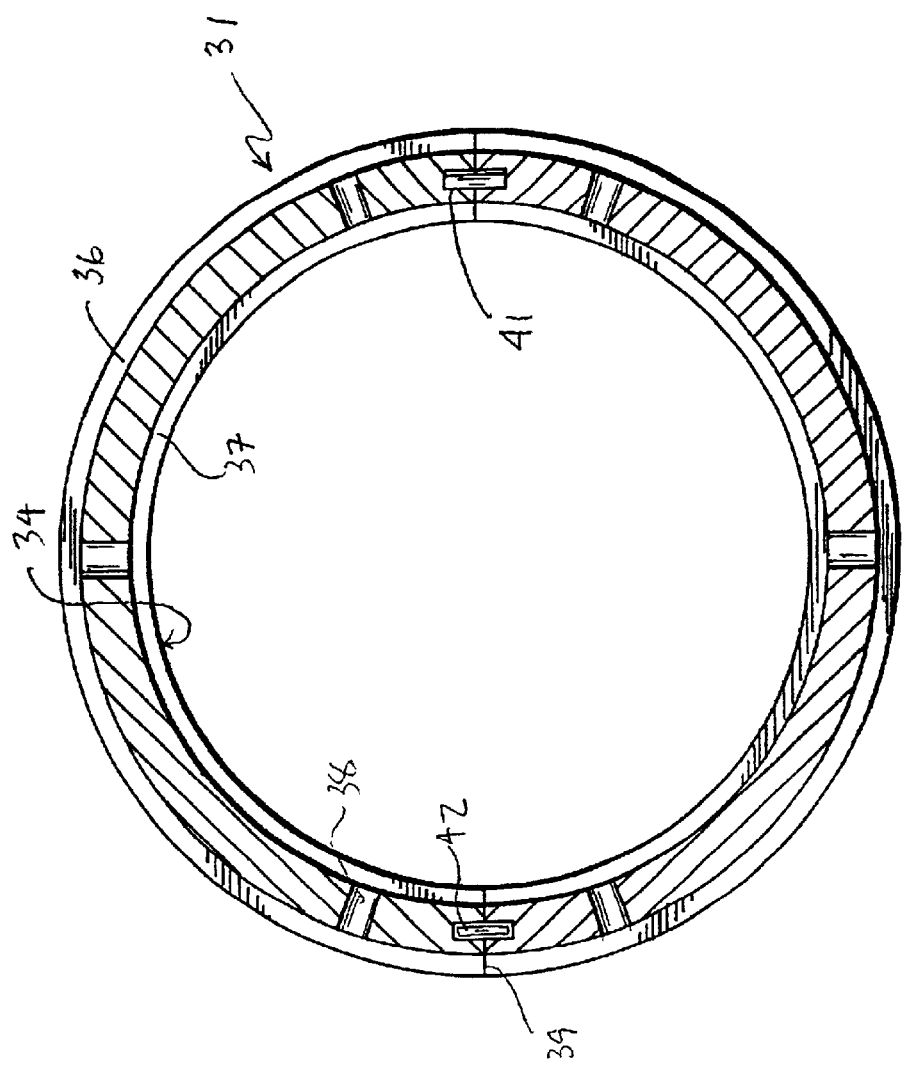
FIG. 4 is a sectional view of the bushing element of FIGS. 2 and 3 taken along line 4–4 of FIG. 3.
Figure 3:
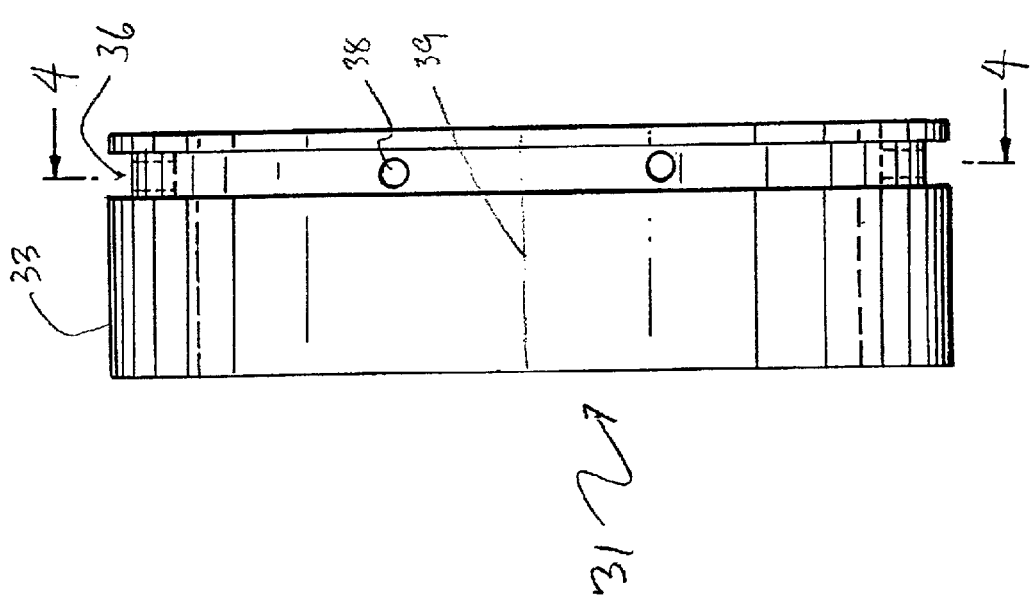
FIG. 3 is a side elevational view of the bushing element of the shaft sealing system of FIG. 2 prepared in accordance with the invention.

In FIG. 3, bushing seal element 31 is shown in a side elevational view. Bushing seal 31 is custom made for a particular shaft and pump. A cross-sectional elevational view of bushing seal element 31 is shown in cross-section in FIG. 4.

Bushing seal element 31 is a substantially cylindrical rigid member with an outer surface 33 and with an inner bore 34 dimensioned to be slightly larger than the outer dimension of pump shaft 14 and fit within inner bore 21 of pump housing 19. Outer surface 33 of seal element 31 is formed with an outer seal water groove 36 at the gland end thereof. Inner bore 37 of seal element 31 provides an additional bearing surface for shaft 14 when in position as shown in FIG. 2, and this is custom dimensioned for a particular mechanical device.

Bushing seal 31 is also formed with an inner seal water groove 37 formed in a position corresponding to the location of outer seal water groove 36 to create a lantern ring at the gland end of seal element 31. A plurality of seal water holes 38 are formed between outer seal water groove 36 and inner groove 37. Bushing seal element 31 is fabricated so that outer surface 33 at the impeller end is longer than the width of outer seal water groove 36.

Bushing seal element 31 is substantially rigid and formed of materials which will not be attacked or destroyed by corrosive fluids being transported by pump 11. Preferred materials of construction include non-ferrous materials, molybdenum/carbon or glass filled thermoplastic material, such as polytetrafluoroethylene (PTFE) or other suitable plastic material. Materials are selected that can provide a suitable bearing surface and are resistant to most industrial solutions.

In order to place bushing seal element 31 in position in seal cavity 22, bushing seal element 31 is split along a center line 39. Splitting bushing seal element 31 along a diameter allows seal element 31 to be placed about installed shaft 14 and pushed into position at the impeller end of seal cavity 22. Generally, at least one or two packing rings 32 are positioned on the gland side of seal element 31.

Bushing seal 31 split along center line 38 includes a pair of corresponding holes 41 on both halves of split bushing seal 31 for receiving mounting pins 42 for realignment and reassembly of bushing seal 31. In this construction, pins 42 are PTFE and insure that when bushing seal 31 is secured about shaft 14, outer seal water groove 36 and inner groove 37 are properly aligned on both sections. Outer seal water groove 38 is dimensioned to align with a flush port 25 formed in housing 19.

FIG. 5 illustrates an embodiment of the invention wherein a modified shaft sealing system 50 with a bushing seal element 51 includes an outer surface 52 with an O-ring 53 groove positioned in seal cavity 22. An O-ring 54 is positioned in O-ring groove 53 formed on outer surface 52 of bushing seal 51. O-ring 54 can be formed of a variety of resilient materials, including perfluoroelastomers or other resilient material compatible with the pumped fluid for providing an additional barrier to isolate the motor end of shaft 14 from fluid entering seal cavity 22. O-ring 54 provides an additional obstacle to prevent fluid from entering seal cavity.

It can readily be seen that the seal system including a cylindrical seal and seal system constructed in accordance with the invention can be easily installed in a conventional rotary impeller pump with PTFE pins to guarantee alignment of the seal upon installation. Generally only two packing rings are added to complete installation. When in place, the seal will support the impeller end of the pump shaft, providing an additional bearing surface to aid in eliminating the whip commonly found in pump shafts. Since the clearance between the pump shaft and the bushing is relatively small, seal water entering the lantern ring groove would be considerably throttled, thereby minimizing the quantity of seal water flushing and lubricating the bearing and finally entering into and diluting the product being pumped.

Due to the close tolerances available, improved support of the impeller is assured, resulting in longer life of the main bearings and packing materials as well as reduced wear of the throat of the rotary device. Minimum seal water is required with less product contamination because of this throttling effect. Minimum external leakage also results from the installation of the sealing system constructed and arranged in accordance with the invention.

It will thus be seen that the object set forth above, among those made apparent from the preceding description are efficiently attained and, since certain changes may be made in the device set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, may be said to fall there between.

What is claimed is:

1. A shaft sealing system for use in a seal cavity of a rotary mechanical device having an output end and a motor end, the device being driven by a rotating shaft coupled to a motor, comprising a substantially rigid cylindrical body dimensioned to fit into the seal cavity and having an outer surface closely dimensioned to fit into the seal cavity with an inner bore closely dimensioned along the full length of the cylindrical body to fit over the shaft at one end of the seal cavity to provide a bearing surface for the shaft;

the cylindrical body having a cylindrical outer wall formed with a groove and an internal groove in the inner bore at the location of the outer groove to form an integral lantern ring with at least one hole connecting the inner groove and outer groove for passage of seal fluid.

2. The shaft sealing system of claim 1, wherein the body is formed of a non-ferrous metal material.

3. The shaft sealing system of claim 1, wherein the body is formed from a filled thermoplastic material.

4. The shaft sealing system of claim 3, wherein the thermoplastic material is filled with at least one of molybdenum, carbon and glass.

5. The shaft sealing system of claim 1, wherein the width of the outer groove is narrower than the length of cylindrical outer wall of the cylindrical body.

6. The shaft sealing system of claim 1, wherein the cylindrical body is split along a center-line.

7. The shaft sealing system of claim 6, wherein corresponding alignment holes are formed in each side of the split seal and alignment pins are positioned in the alignment holes.

8. The shaft sealing system of claim 1, wherein the outer surface of the cylindrical body includes a groove with an O-ring disposed therein.

9. The shaft sealing system of claim 1, further including at least one packing ring disposed on the motor side of the rigid cylindrical body in the seal cavity.

10. The shaft sealing system of claim 9, wherein the at least one packing ring is a compressible packing ring.

11. The shaft sealing system of claim 1, wherein the rotary device is a rotary pump.

12. The shaft sealing system of claim 1, wherein the groove on the outer wall is formed at the motor end of the cylindrical body.

13. The shaft sealing system of claim 1, wherein the seal fluid is water.

14. The shaft sealing system of claim 1, wherein the cylindrical body is positioned at the output end of the seal cavity.

15. A method for providing a bearing surface for a rotary mechanical device having a seal cavity with an output end and motor end, comprising: providing a substantially rigid cylindrical body of claim 1.

16. The method of providing a bearing surface of claim 15, including the step of splitting a substantially rigid cylindrical body and positioning the about the shaft at the impeller end of the seal cavity.

17. The method of providing a bearing surface of claim 16, further including the step of inserting at least one compressible sealing ring at the motor end of the substantially rigid cylindrical body.

* * * * *